United States Patent
Shin et al.

(10) Patent No.: US 11,760,163 B2
(45) Date of Patent: Sep. 19, 2023

(54) AIR CONDITIONING SYSTEM FOR ELECTRIC VEHICLES

(71) Applicants: HYUNDAI MOTOR COMPANY, Seoul (KR); KIA CORPORATION, Seoul (KR); SEOUL NATIONAL UNIVERSITY R&DB FOUNDATION, Seoul (KR)

(72) Inventors: Gee Young Shin, Suwon-si (KR); Dong Ho Kwon, Yongin-si (KR); Myung Hoe Kim, Seoul (KR); Seung Sik Han, Hwaseong-si (KR); Min Soo Kim, Seoul (KR); Gwi Taek Kim, Seoul (KR); Sun Ik Na, Seoul (KR)

(73) Assignees: HYUNDAI MOTOR COMPANY, Seoul (KR); KIA CORPORATION, Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 7 days.

(21) Appl. No.: 17/379,757

(22) Filed: Jul. 19, 2021

(65) Prior Publication Data

US 2022/0144046 A1    May 12, 2022

(30) Foreign Application Priority Data

Nov. 6, 2020  (KR) .................. 10-2020-0147717

(51) Int. Cl.
*B60H 3/02*    (2006.01)
*B60H 1/00*    (2006.01)
*B60H 1/14*    (2006.01)

(52) U.S. Cl.
CPC ......... *B60H 1/143* (2013.01); *B60H 1/00392* (2013.01); *B60H 3/024* (2013.01); *B60H 2003/028* (2013.01)

(58) Field of Classification Search
CPC .. B60H 3/024; B60H 2003/028; F24F 1/1429
See application file for complete search history.

(56) References Cited

U.S. PATENT DOCUMENTS

| | | | | |
|---|---|---|---|---|
| 5,335,719 | A * | 8/1994 | Khelifa | F24F 3/1423 62/271 |
| 5,950,447 | A * | 9/1999 | Maeda | F24F 3/1429 62/271 |
| 7,905,108 | B2 * | 3/2011 | Ikegami | F24F 3/1411 62/271 |
| 10,406,889 | B2 * | 9/2019 | Sakamoto | F25B 47/02 |
| 10,864,802 | B2 * | 12/2020 | Kakizaki | B60H 1/00564 |
| 2010/0000243 | A1 * | 1/2010 | Morimoto | F25D 21/04 62/271 |
| 2010/0281904 | A1 * | 11/2010 | Yokomachi | B60H 3/024 165/104.34 |

FOREIGN PATENT DOCUMENTS

KR    1020080092527    10/2008

* cited by examiner

*Primary Examiner* — Christopher R Zerphey
(74) *Attorney, Agent, or Firm* — LEMPIA SUMMERFIELD KATZ LLC

(57) ABSTRACT

An air conditioning system for electric vehicles reduces a thermal load endured by the air conditioning system using desiccant-coated heat exchangers and improves energy efficiency using waste heat resulting from cooling of an electronic device when the desiccant-coated heat exchanger is regenerated.

12 Claims, 10 Drawing Sheets

AIR CONDITIONING SYSTEM FOR ELECTRIC VEHICLES

CROSS-REFERENCE TO RELATED APPLICATION

This application claims priority to Korean Patent Application No. 10-2020-0147717, filed on Nov. 6, 2020 in the Korean Intellectual Property Office, the disclosure of which is incorporated herein by reference in its entirety.

BACKGROUND

1. Field of the Disclosure

The present disclosure relates to an air conditioning system for electric vehicles, which reduces a thermal load endured by the air conditioning system using desiccant-coated heat exchangers. The system further improves energy efficiency using waste heat resulting from cooling of an electronic device when the desiccant-coated heat exchanger is regenerated.

2. Description of the Related Art

Electric vehicles are emerging recently as a social issue in order to implement environmentally friendly technology and to solve problems, such as energy exhaustion. Electric vehicles are operated using a motor, which receives electricity supplied from a battery and outputs power. Therefore, electric vehicles have advantages, such as no carbon dioxide emission, low noise and the energy efficiency of a motor, which is higher than the energy efficiency of an engine. Thus, electric vehicles are being spotlighted as eco-friendly vehicles.

In implementation of these electric vehicles, technology related to battery modules is used as core technology, and research on weight reduction, miniaturization and rapid charging of batteries is being actively conducted at present. Battery modules must be used in an optimal temperature environment in order to maintain the optimal performance and long lifespan thereof. However, it is difficult to use the battery modules in the optimal temperature environment owing to the heat generated during driving and changes in the external temperature.

Further, an electric vehicle does not have a waste heat source generated from a separate engine during combustion as in an internal combustion engine and thus performs heating of the interior thereof using an electric heating device. The electric vehicle must be warmed up to improve the charging and discharging performance of a battery in cold weather and thus uses a separate cooling water heating-type electric heater. In other words, technology, in which a heating and cooling system for adjusting the temperature of a battery module so as to maintain the optimal temperature environment of the battery module is operated separately from a heating and cooling system for conditioning air in the interior of the vehicle, is used.

In such an electric vehicle, as a thermal load endured by the air conditioning system increases, the consumption amount of electric energy increases and thus the driving range of the electric vehicle is shortened. Particularly, when the air conditioning system performs a cooling operation or a dehumidification operation in the winter, the energy consumption amount of the air conditioning system increases. In other words, the cooling load includes a sensible heat load and a latent heat load, and a considerable portion of the cooling load is attributable to the latent heat load of condensation. Further, because, during the dehumidification operation in the winter, air must be cooled to a dew point or lower so that vapor is condensed, and then be heated again for the purpose of dehumidification, energy loss occurs.

The above information disclosed in the Background section is only to enhance understanding of the background of the present disclosure and should not be interpreted as describing conventional technology that is already known to those having ordinary skill in the art.

SUMMARY

Therefore, the present disclosure has been made in view of the above problems. It is an object of the present disclosure to provide an air conditioning system for electric vehicles, which reduces a thermal load endured by the air conditioning system using desiccant-coated heat exchangers, and which improves energy efficiency using waste heat resulting from cooling of an electronic device when the desiccant-coated heat exchanger is regenerated.

In accordance with an aspect of the present disclosure, the above and other objects can be accomplished by the provision of an air conditioning system for electric vehicles. The system includes a refrigerant line configured to circulate a refrigerant therealong and to be connected to a compressor, a condenser, an expander and an evaporator. The system further includes a cooling water line configured to circulate cooling water therealong, to be connected to a first dehumidification heat exchanger and a second dehumidification heat exchanger, and configured to remove moisture from air, a radiator-type heat exchanger and an electronic device. The cooling water line is further configured to switch between circulation of low-temperature cooling water and circulation of high-temperature cooling water depending on whether or not the first dehumidification heat exchanger and the second dehumidification heat exchanger perform a dehumidification operation or a regeneration operation. The system further includes an indoor air line configured to enable indoor air to selectively pass through the first dehumidification heat exchanger and the second dehumidification heat exchanger and to enable the indoor air having passed through the first dehumidification heat exchanger or the second dehumidification heat exchanger to be provided to an interior of a vehicle via the evaporator and a heater. The system further includes an outdoor air line configured to enable outdoor air to selectively pass through the first dehumidification heat exchanger and the second dehumidification heat exchanger and to enable the outdoor air having passed through the condenser and the radiator-type heat exchanger to be discharged outside via the first dehumidification heat exchanger or the second dehumidification heat exchanger.

When the first dehumidification heat exchanger performs the dehumidification operation and the second dehumidification heat exchanger performs the regeneration operation, the low-temperature cooling water flowing along the cooling water line may be circulated to the first dehumidification heat exchanger, and the high-temperature cooling water flowing along the cooling water line may be circulated to the second dehumidification heat exchanger.

The low-temperature cooling water having passed through the radiator-type heat exchanger may be circulated to the first dehumidification heat exchanger. The high-temperature cooling water having passed through the electronic device may be circulated to the second dehumidification heat exchanger, along the cooling water line.

The indoor air may pass through the first dehumidification heat exchanger along the indoor air line. The outdoor air may pass through the second dehumidification heat exchanger along the outdoor air line.

When the first dehumidification heat exchanger performs the regeneration operation and the second dehumidification heat exchanger performs the dehumidification operation, the low-temperature cooling water flowing along the cooling water line may be circulated to the second dehumidification heat exchanger, and the high-temperature cooling water flowing along the cooling water line may be circulated to the first dehumidification heat exchanger.

The low-temperature cooling water having passed through the radiator-type heat exchanger may be circulated to the second dehumidification heat exchanger. The high-temperature cooling water having passed through the electronic device may be circulated to the first dehumidification heat exchanger, along the cooling water line.

The indoor air may pass through the second dehumidification heat exchanger along the indoor air line. The outdoor air may pass through the first dehumidification heat exchanger along the outdoor air line.

The radiator-type heat exchanger may be disposed in front of the condenser on the outdoor air line so that the outdoor air passes through the radiator-type heat exchanger and then passes through the condenser.

The air conditioning system for electric vehicles may further include an additional heat exchanger provided on the cooling water line and configured to exchange heat with the outdoor air. The outdoor air line may include a first outdoor air line configured to enable the outdoor air to pass through the condenser and the radiator-type heat exchanger and then to be discharged outside. The outdoor air line may further include a second outdoor air line configured to enable the outdoor air to flow thereinto at a position different from a position of the first outdoor air line so as to pass through the additional heat exchanger and then to selectively pass through the first dehumidification heat exchanger and the second dehumidification heat exchanger.

When the first dehumidification heat exchanger performs the dehumidification operation and the second dehumidification heat exchanger performs the regeneration operation, the low-temperature cooling water having passed through the additional heat exchanger may be circulated to the first dehumidification heat exchanger along the cooling water line, and the high-temperature cooling water having passed through the electronic device may be circulated to the second dehumidification heat exchanger and the radiator-type heat exchanger along the cooling water line.

When a temperature of the cooling water having passed through the electronic device does not satisfy a temperature required for regeneration of the second dehumidification heat exchanger, the high-temperature cooling water having passed through the electronic device may be circulated only to the second dehumidification heat exchanger along the cooling water line.

The indoor air may pass through the first dehumidification heat exchanger along the indoor air line. Outdoor air may pass through the condenser and the radiator-type heat exchanger along the first outdoor air line. The outdoor air may pass through the additional heat exchanger and the second dehumidification heat exchanger along the second outdoor air line.

When the first dehumidification heat exchanger performs the regeneration operation and the second dehumidification heat exchanger performs the dehumidification operation, the low-temperature cooling water having passed through the additional heat exchanger may be circulated to the second dehumidification heat exchanger along the cooling water line, and the high-temperature cooling water having passed through the electronic device may be circulated to the first dehumidification heat exchanger and the radiator-type heat exchanger along the cooling water line.

When a temperature of the cooling water having passed through the electronic device does not satisfy a temperature required for regeneration of the first dehumidification heat exchanger, the high-temperature cooling water having passed through the electronic device may be circulated only to the first dehumidification heat exchanger along the cooling water line.

The indoor air may pass through the second dehumidification heat exchanger along the indoor air line. The outdoor air may pass through the condenser and the radiator-type heat exchanger along the first outdoor air line. The outdoor air may pass through the additional heat exchanger and the first dehumidification heat exchanger along the second outdoor air line.

The indoor air line and the outdoor air line may be provided with a first duct valve configured to enable the indoor air or the outdoor air to be selectively circulated to the first dehumidification heat exchanger and the second dehumidification heat exchanger. The indoor air line and the outdoor air line may be further provided with a second duct valve configured to enable the indoor air or the outdoor air having passed through the first dehumidification heat exchanger and the second dehumidification heat exchanger to be circulated to the interior of the vehicle or outside, the indoor air and the outdoor air being circulated to the first duct valve and the second duct valve.

A plurality of valves may be provided on the cooling water line so as to determine a circulation path of the cooling water circulated to the first dehumidification heat exchanger, the second dehumidification heat exchanger, the radiator-type heat exchanger and the electronic device depending on whether or not the valves are opened or closed.

The cooling water line may include: a first cooling water line configured to connect the first dehumidification heat exchanger to the radiator-type heat exchanger; a second cooling water line configured to connect the second dehumidification heat exchanger to the first cooling water line; a third cooling water line and a fourth cooling water line configured to branch off from the radiator-type heat exchanger and to be respectively connected to the first dehumidification heat exchanger and the second dehumidification heat exchanger; a fifth cooling water line and a sixth cooling water line configured to branch off from the electronic device and to be respectively connected to the first dehumidification heat exchanger and the second dehumidification heat exchanger; a seventh cooling water line configured to branch off from the first cooling water line and to be connected to the electronic device; and an eighth cooling water line configured to branch off from the second cooling water line and to be connected to the electronic device.

A first valve may be provided at a connection point between the first cooling water line and the second cooling water line. A second valve may be provided at a branching point between the third cooling water line and the fourth cooling water line. A third valve may be provided at a branching point between the fifth cooling water line and the sixth cooling water line. A fourth valve may be provided at a branching point between the first cooling water line and the seventh cooling water line. A fifth valve may be provided at a branching point between the second cooling water line and the eighth cooling water line.

The air conditioning system for electric vehicles may further include an additional heat exchanger provided on the cooling water line and configured to exchange heat with the outdoor air. The cooling water line may include: a first connection line configured to connect the first dehumidification heat exchanger to the radiator-type heat exchanger; a second connection line configured to connect the radiator-type heat exchanger to the electronic device; a third connection line configured to branch off from the first connection line and to be connected to the additional heat exchanger; a fourth connection line and a fifth connection line configured to branch off from the additional heat exchanger and to be respectively connected to the first dehumidification heat exchanger and the second dehumidification heat exchanger; a sixth connection line and a seventh connection line configured to branch off from the electronic device and to be respectively connected to the first dehumidification heat exchanger and the second dehumidification heat exchanger; an eighth connection line configured to branch off from the first connection line and to be connected to the electronic device; and a ninth connection line and a tenth connection line configured to branch off from the second dehumidification heat exchanger and to be respectively connected to the third connection line and the radiator-type heat exchanger.

A first adjustment valve may be provided at a branching point between the first connection line and the third connection line. A second adjustment valve may be provided at a connection point between the third connection line and the ninth connection line. A third adjustment valve may be provided at a branching point between the fourth connection line and the fifth connection line. A fourth adjustment valve may be provided at a branching point between the sixth connection line and the seventh connection line. A fifth adjustment valve may be provided at a branching point between the first connection line and the eighth connection line. A sixth adjustment valve may be provided at a branching point between the ninth connection line and the tenth connection line.

The cooling water line may further include: an eleventh connection line configured to branch off from the ninth connection line and to be connected to the second connection line; a seventh adjustment valve may be provided at a branching point between the ninth connection line and the eleventh connection line; and an eighth adjustment valve may be provided at a connection point between the eleventh connection line and the second connection line.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE DISCLOSED EMBODIMENTS

Reference is now made in detail to embodiments of the present disclosure, examples of which are illustrated in the accompanying drawings. Wherever possible, the same reference numbers are used throughout the drawings to refer to the same or equivalent parts. When a component, device, element, or the like of the present disclosure is described as having a purpose or performing an operation, function, or the like, the component, device, or element should be considered herein as being "configured to" meet that purpose or to perform that operation or function. Further, the controller described herein may include a processor programmed to perform the noted operations, functions, or the like.

Hereinafter, an air conditioning system for electric vehicles according to the embodiments of the present disclosure are described with reference to the accompanying drawings.

Figure 1:
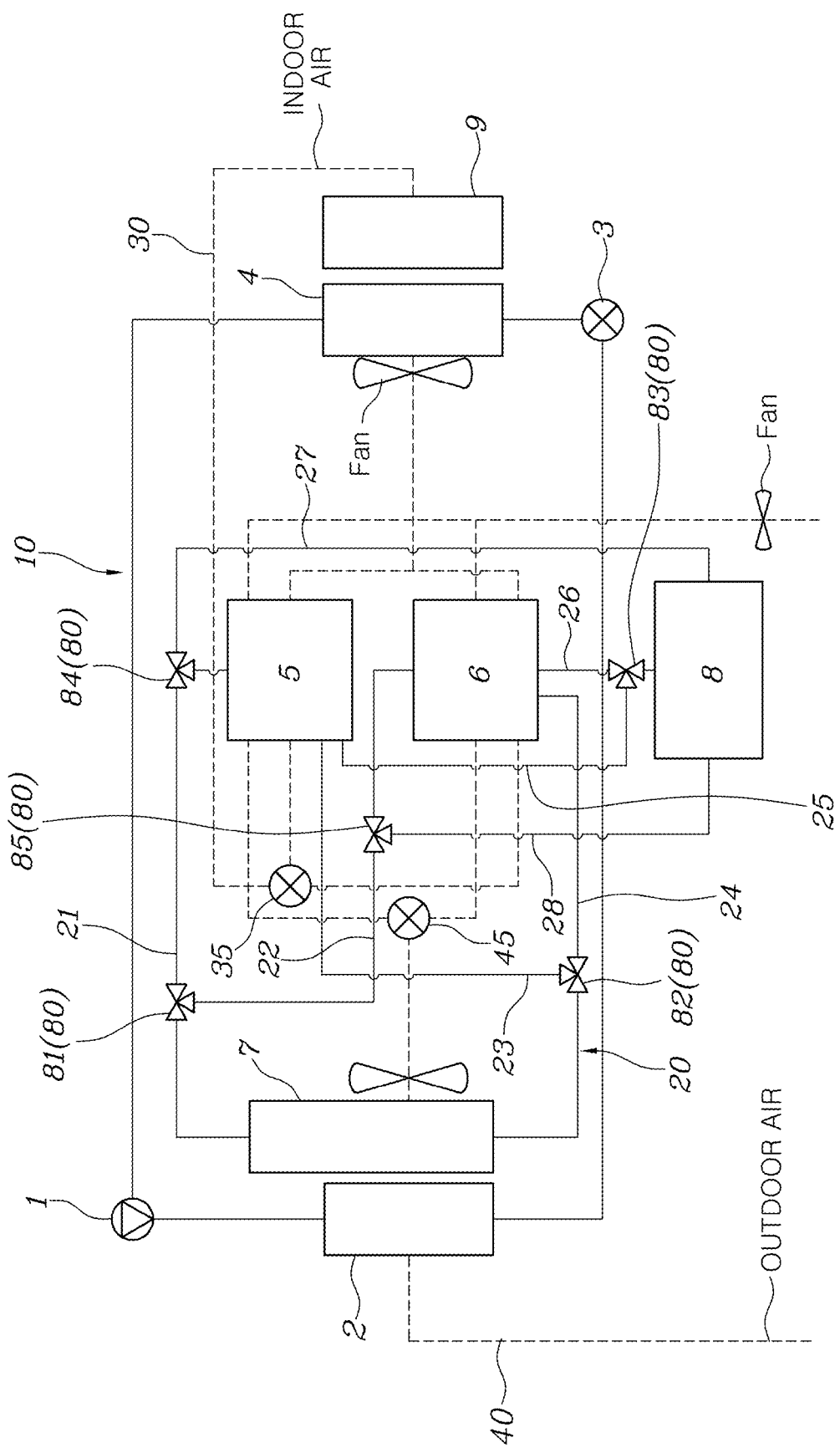
FIG. 1 is a circuit diagram of an air conditioning system for electric vehicles according to a first embodiment of the present disclosure.
Figure 2:
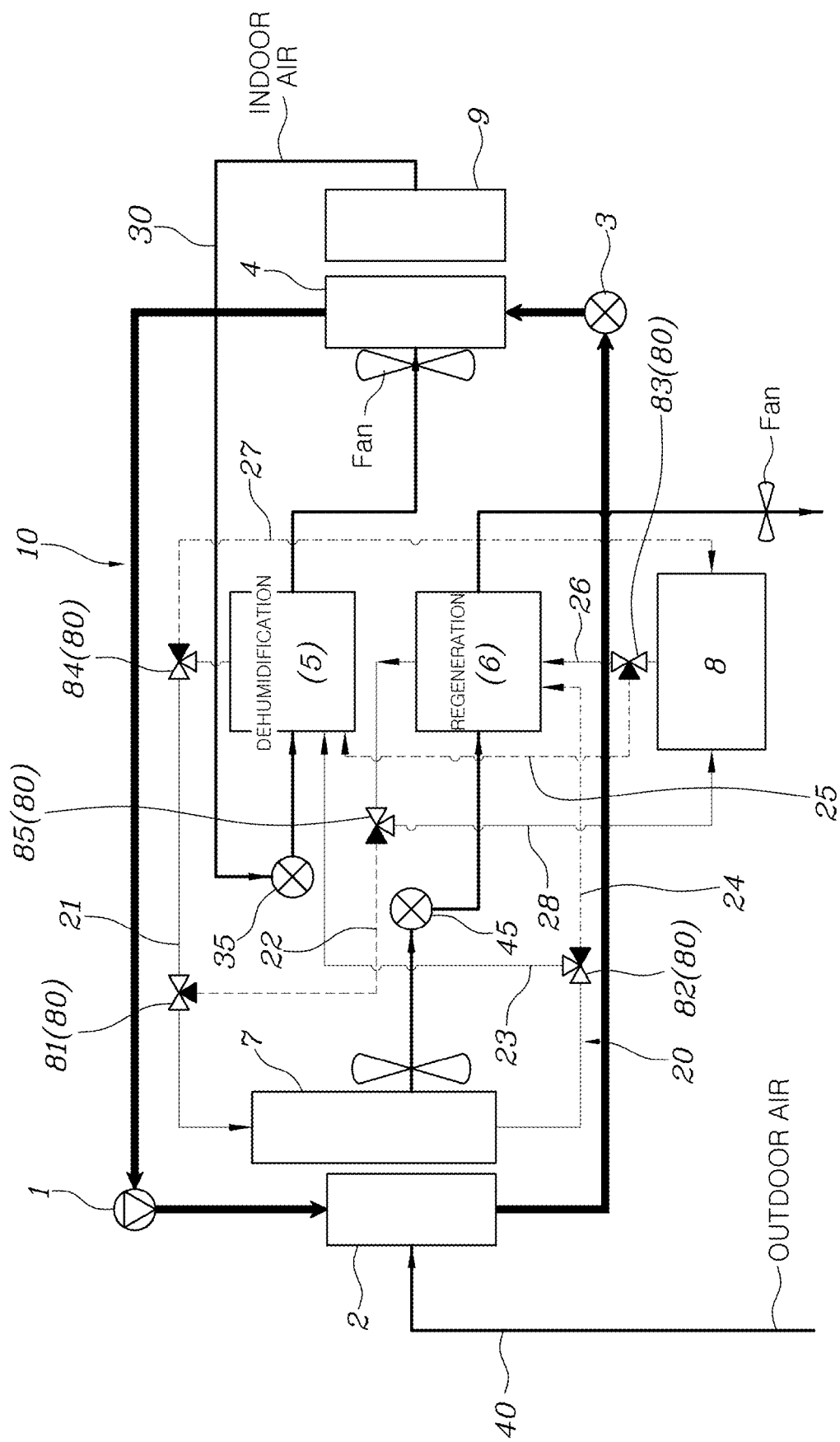
FIGS. 2 and 3 are circuit diagrams for illustrating the air conditioning system for electric vehicles according to the first embodiment of the present disclosure.
Figure 3:
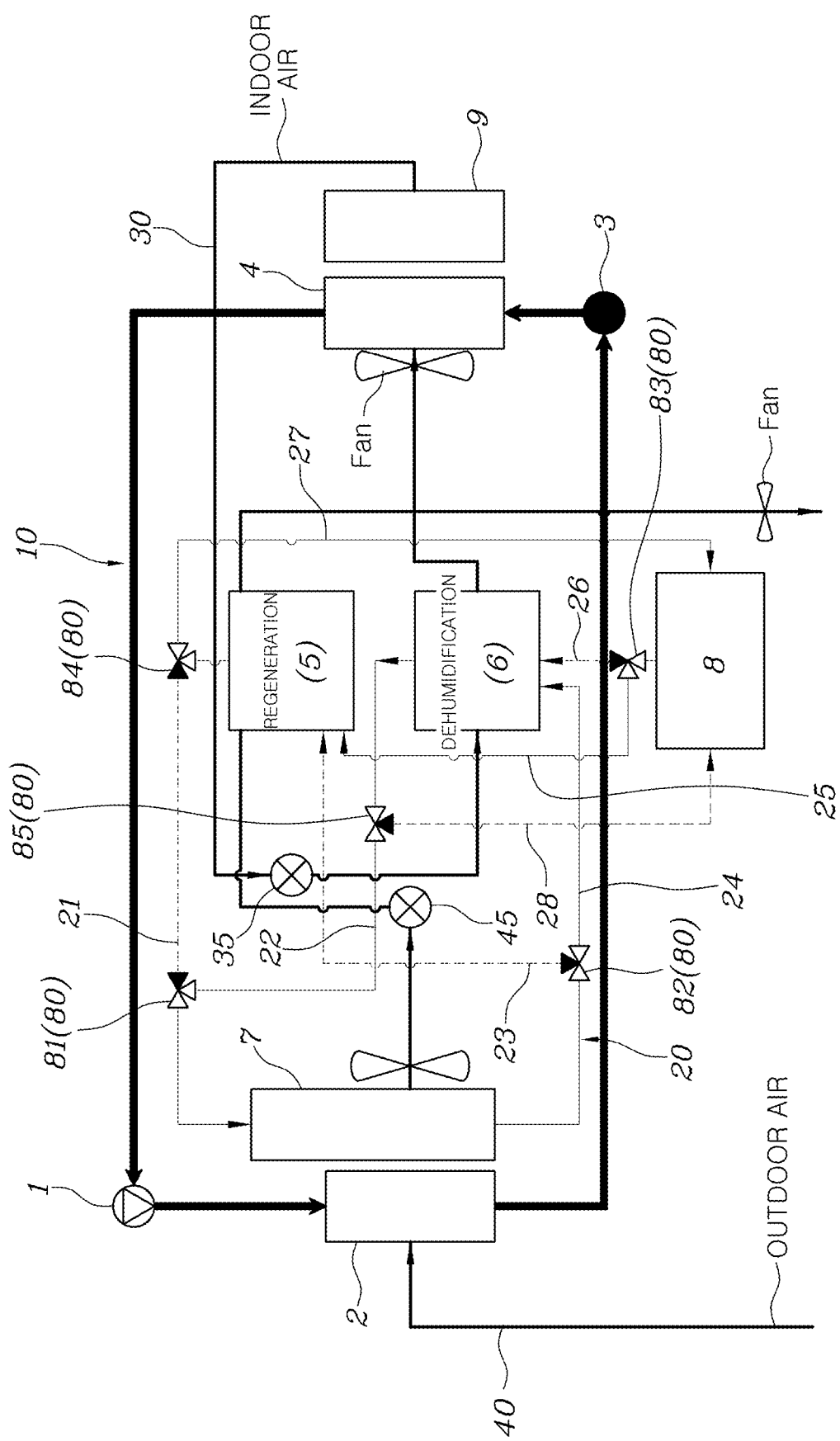
Figure 4:
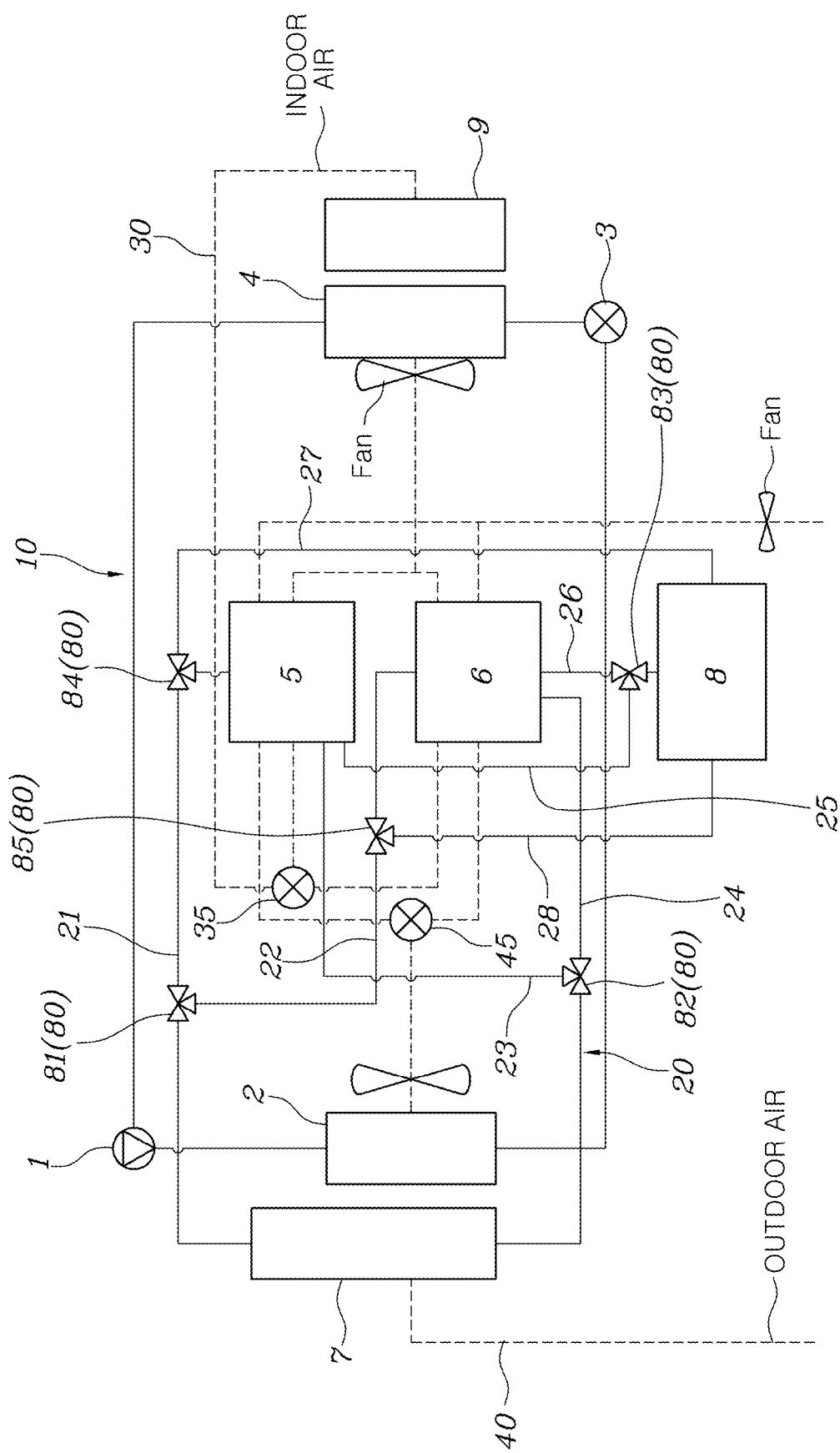
FIG. 4 is a circuit diagram of an air conditioning system for electric vehicles according to a second embodiment of the present disclosure.
Figure 5:
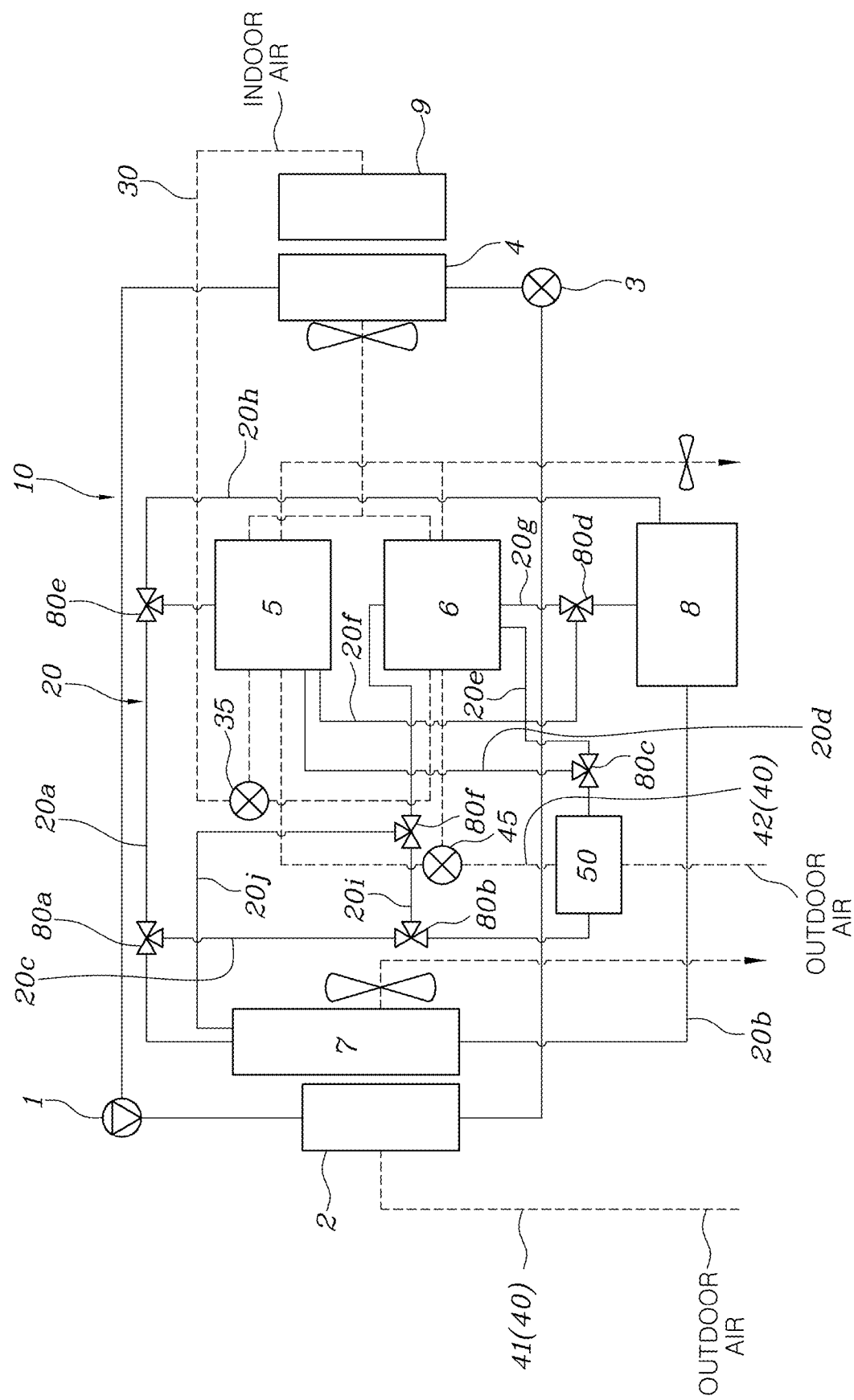
FIG. 5 is a circuit diagram of an air conditioning system for electric vehicles according to a third embodiment of the present disclosure.
Figure 6:
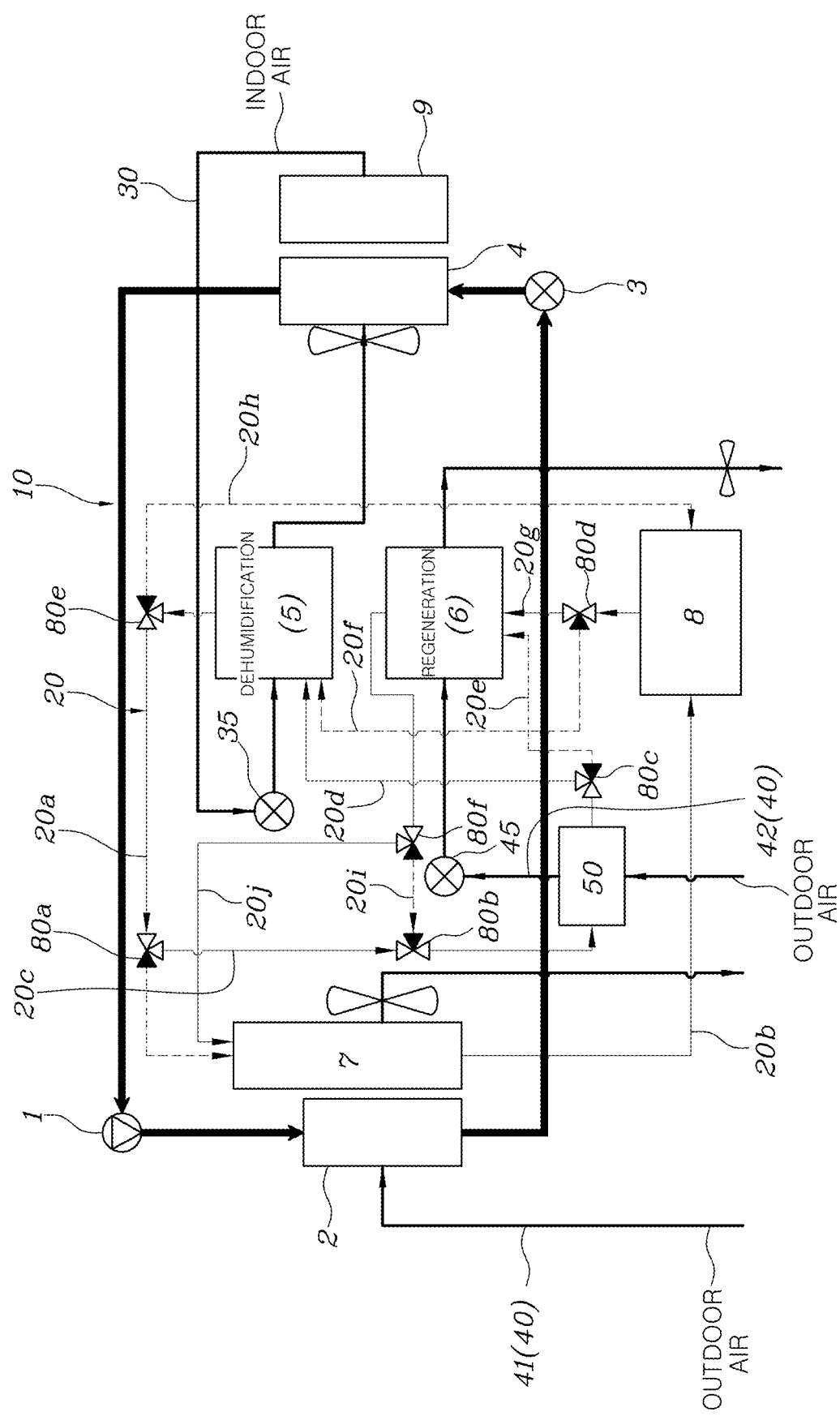
FIGS. 6 and 7 are circuit diagrams for illustrating the air conditioning system for electric vehicles according to the third embodiment of the present disclosure.
Figure 7:
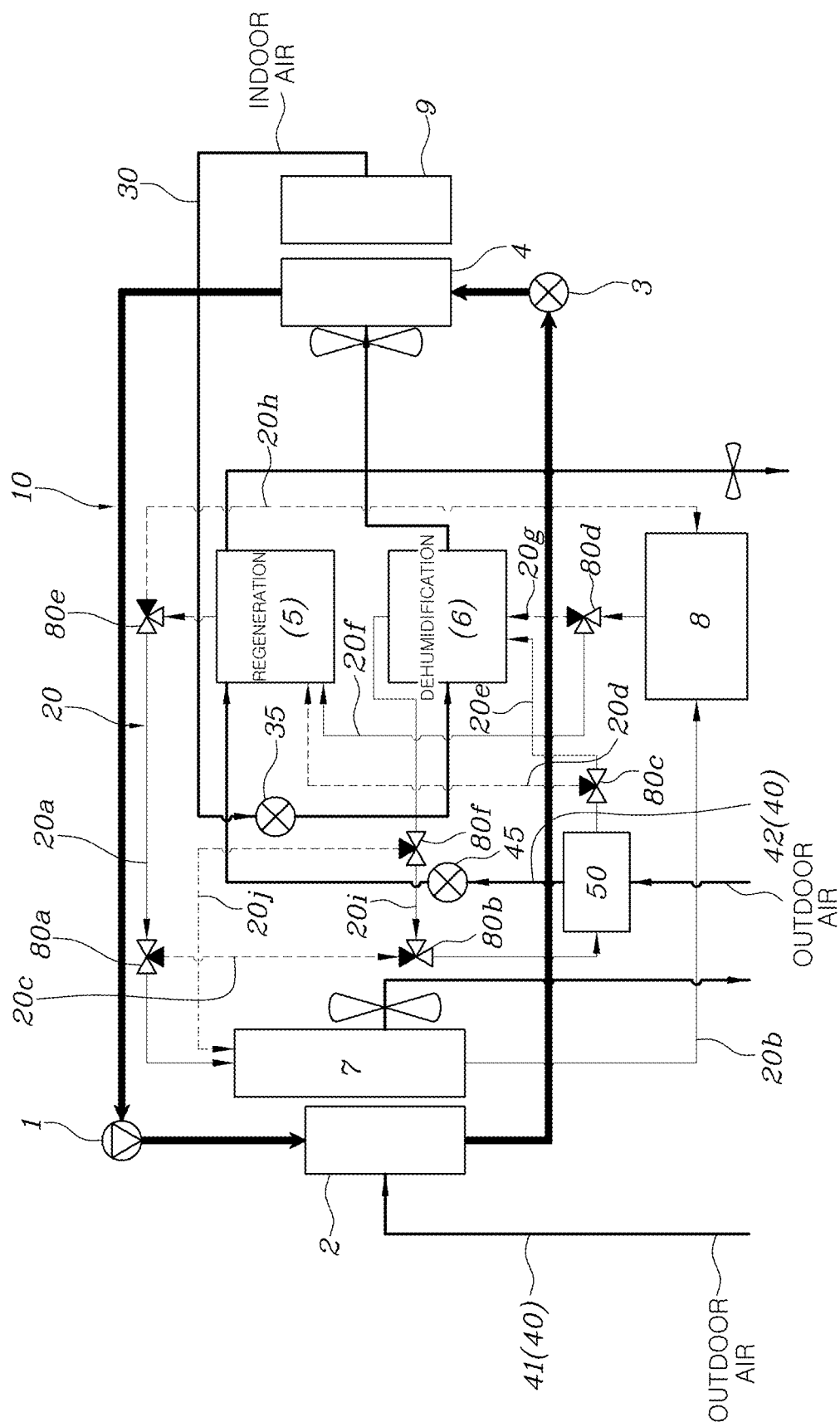
Figure 8:
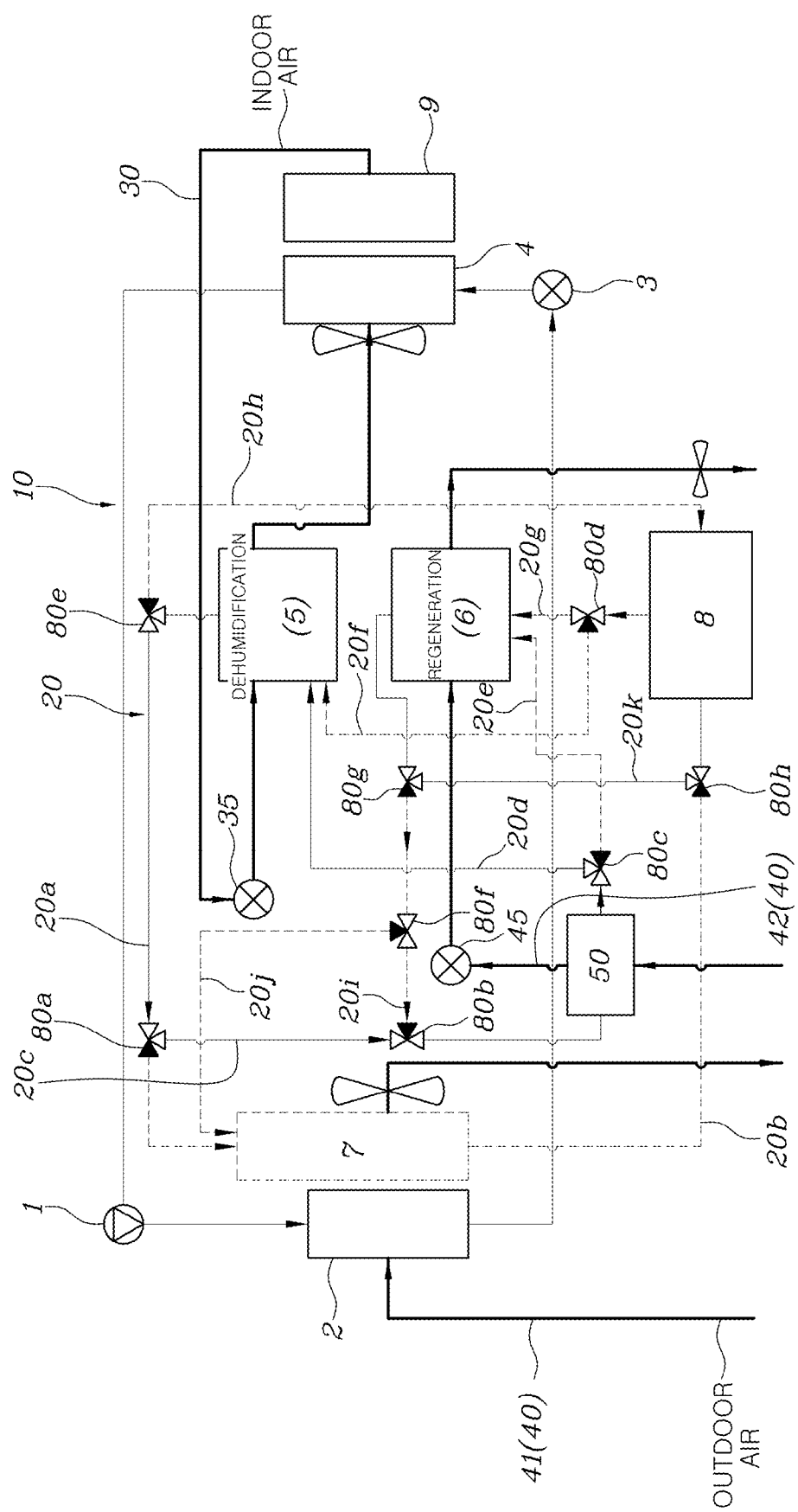
FIGS. 8 and 9 are circuit diagrams for illustrating an air conditioning system for electric vehicles according to a fourth embodiment of the present disclosure.
Figure 9:
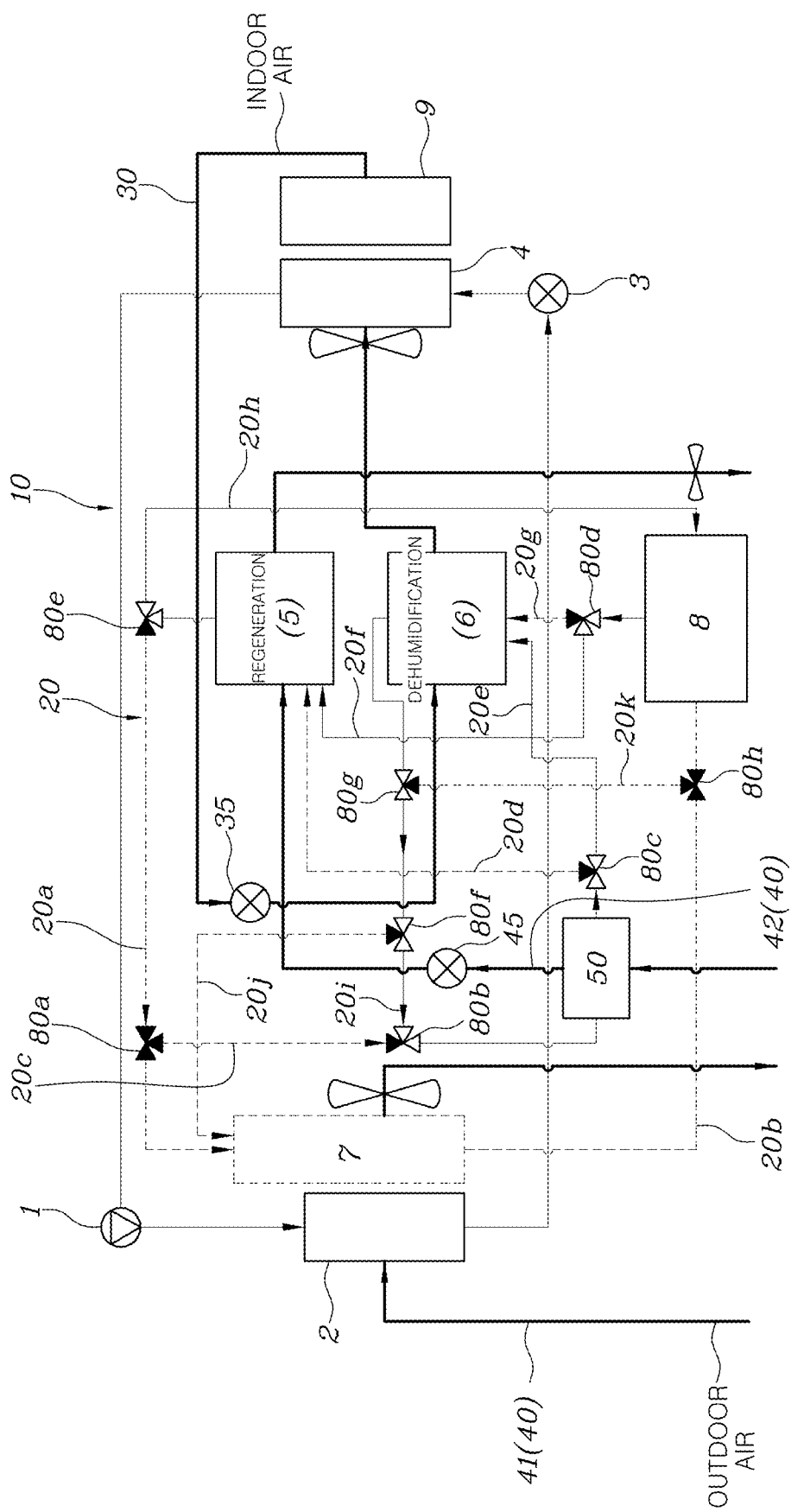
Figure 10:
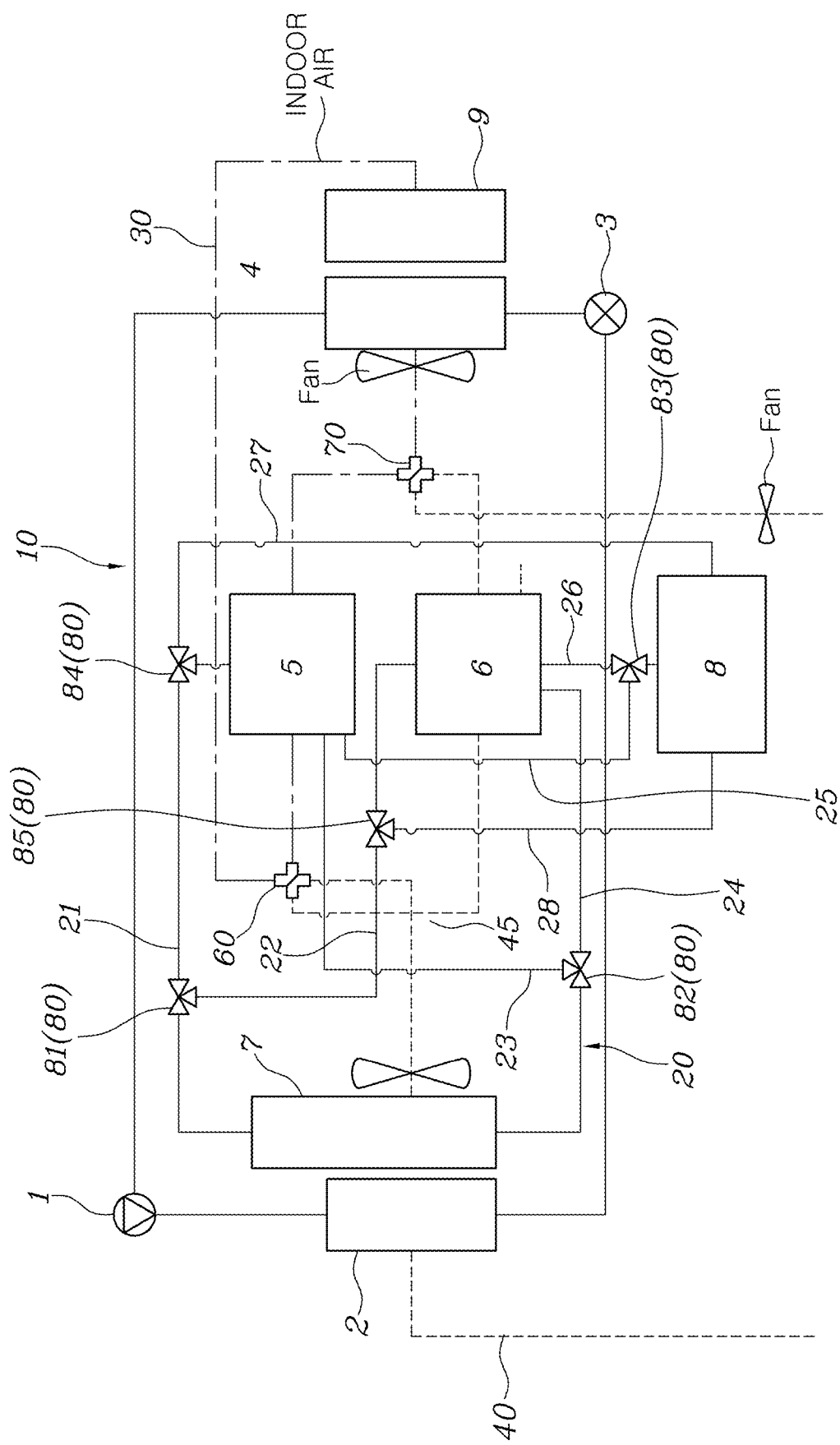
FIG. 10 is a circuit diagram of an air conditioning system for electric vehicles according to a fifth embodiment of the present disclosure.

FIG. 1 is a circuit diagram of an air conditioning system for electric vehicles according to a first embodiment of the present disclosure. FIGS. 2 and 3 are circuit diagrams for illustrating the air conditioning system for electric vehicles according to the first embodiment of the present disclosure. FIG. 4 is a circuit diagram of an air conditioning system for electric vehicles according to a second embodiment of the present disclosure. FIG. 5 is a circuit diagram of an air conditioning system for electric vehicles according to a third embodiment of the present disclosure. FIGS. 6 and 7 are circuit diagrams for illustrating the air conditioning system for electric vehicles according to the third embodiment of the present disclosure. FIGS. 8 and 9 are circuit diagrams for illustrating an air conditioning system for electric vehicles according to a fourth embodiment of the present disclosure. FIG. 10 is a circuit diagram of an air conditioning system for electric vehicles according to a fifth embodiment of the present disclosure.

An air conditioning system for electric vehicles according to the present disclosure includes, as shown in FIG. 1, a refrigerant line 10 configured to circulate a refrigerant therealong and to be connected to a compressor 1, a condenser 2, an expander 3 and an evaporator 4. The system further includes a cooling water line 20 configured to circulate cooling water therealong, to be connected to a first dehumidification heat exchanger 5 and a second dehumidification heat exchanger 6, and configured to remove moisture from air, a radiator-type heat exchanger 7 and an electronic device 8. The cooling water line 20 is further configured to switch between circulation of low-temperature cooling water and circulation of high-temperature cooling water depending on whether or not the first dehumidification heat exchanger 5 and the second dehumidification heat exchanger 6 perform a dehumidification operation or a regeneration operation. The system further includes an indoor air line 30 configured to enable indoor air to selectively pass through the first dehumidification heat exchanger 5 and the second dehumidification heat exchanger 6. The indoor air line 30 is further configured to enable the indoor air having passed through the first dehumidification heat exchanger 5 or the second dehumidification heat exchanger 6 to be provided to the interior of a vehicle via the evaporator 4 and a heater 9. The system further includes an outdoor air line 40 configured to enable outdoor air to selectively pass through the first dehumidification heat exchanger 5 and the second dehumidification heat exchanger 6. The outdoor air line 40 is further configured to enable the outdoor air having passed through the condenser 2 and the radiator-type heat exchanger 7 to be discharged to the outside via the first dehumidification heat exchanger 5 or the second dehumidification heat exchanger 6.

In the present disclosure, all of circulation of the refrigerant, circulation of the cooling water, whether or not the first dehumidification heat exchanger 5 and the second dehumidification heat exchanger 6 perform the dehumidification operation or the regeneration operation, whether or not the heater 9 is operated, etc. may be controlled by a controller. In other words, the controller may perform control of the respective elements depending on a temperature required in the interior of the vehicle, and then provide the conditioned air at the corresponding temperature to the interior of the vehicle.

The refrigerant line 10 is configured to circulate the refrigerant to the compressor 1, the condenser 2, the expander 3, and the evaporator 4 so as to cool the conditioned air.

The cooling water line 20 is configured to circulate the cooling water to the first dehumidification heat exchanger 5, the second dehumidification heat exchanger 6, the radiator-type heat exchanger 7, and the electronic device 8 so as to perform heat exchange. Here, a desiccant is applied to the first dehumidification heat exchanger 5 and the second dehumidification heat exchanger 6 so as to perform dehumidification through heat exchange between the amount of heat, generated when the first dehumidification heat exchanger 5 and the second dehumidification heat exchanger 6 absorb moisture, and the cooling water. Thus, the first dehumidification heat exchanger 5 and the second dehumidification heat exchanger 6 may be desiccant-coated heat exchangers (DCHEs). Further, the electronic device 8 may be an electronic component, such as a motor or an on-board charger (OBC).

Particularly, in the present disclosure, the first dehumidification heat exchanger 5 and the second dehumidification heat exchanger 6 are provided, one of the first dehumidification heat exchanger 5 and the second dehumidification heat exchanger 6 dehumidifies air, and the other of the first dehumidification heat exchanger 5 and the second dehumidification heat exchanger 6 regenerates the desiccant. Thus, the first dehumidification heat exchanger and the second dehumidification heat exchanger 6 alternately perform the dehumidification operation so as to maintain the dehumidifying effect.

By such a system, the cooling water line 20 switches the circulation path of the cooling water so as to selectively circulate low-temperature cooling water or high-temperature cooling water to the first dehumidification heat exchanger 5 or the second dehumidification heat exchanger 6. Thus, the cooling water line 20 is capable of allowing the first dehumidification heat exchanger 5 and the second dehumidification heat exchanger 6 to selectively perform the dehumidification operation or the regeneration operation. For this purpose, a plurality of valves may be provided on the cooling water line 20 so as to determine the circulation path of the cooling water circulated to the first dehumidification heat exchanger 5, the second dehumidification heat exchanger 6, the radiator-type heat exchanger 7, and the electronic device 8 depending on whether or not the valves 80 are opened or closed.

In other words, when the low-temperature cooling water is circulated to the first dehumidification heat exchanger 5 along the cooling water line 20, the first dehumidification heat exchanger 5 performs the dehumidification operation through heat exchange between the cooling water and outdoor air. When the high-temperature cooling water is circulated to the second dehumidification heat exchanger 6 along the cooling water line 20, the second dehumidification heat exchanger 6 performs the regeneration operation using the heat of the cooling water.

Further, the indoor air line 30 along which indoor air is circulated and the outdoor air line 40 along which outdoor air is circulated are provided. Thus, conditioned dry air may be provided to the interior of the vehicle through the indoor air line 30, or air having a high humidity generated during regeneration may be discharged to the outside through the outdoor air line 40. Here, the indoor air line 30 is configured to enable indoor air to selectively pass through the first dehumidification heat exchanger 5 and the second dehumidification heat exchanger 6. The indoor air line 30 is further configured to enable the air, which is dried by the first dehumidification heat exchanger 5 or the second dehumidification heat exchanger 6, to pass through the evaporator 4 and the heater 9 and then to be provided to the interior of the vehicle. Here, the heater 9 may be a PTC heater, and may be operated when the temperature of the conditioned air having passed through the evaporator 4 is adjusted.

The outdoor air line 40 is configured to enable outdoor air to selectively pass through the first dehumidification heat exchanger 5 and the second dehumidification heat exchanger 6. The outdoor air line 40 is further configured to enable the outdoor air having passed through the condenser 2 and the radiator-type heat exchanger 7 to be discharged to the outside via the first dehumidification heat exchanger 5 or the second dehumidification heat exchanger 6. The indoor air line 30 and the outdoor air line 40 may be ducts, and a first adjustment door 35 may be provided on the indoor air line 30 and a second adjustment door 45 may be provided on the outdoor air line 40. Thus, indoor air and outdoor air may selectively pass through the first dehumidification heat exchanger 5 or the second dehumidification heat exchanger 6 depending on whether or not the first adjustment door 35 and the second adjustment door 45 are opened or closed.

By such a system, in the present disclosure, the cooling water circulation direction along the cooling water line 20 is determined so that, when any one of the first dehumidification heat exchanger 5 and the second dehumidification heat exchanger 6 performs the dehumidification operation, the other may perform the regeneration operation. The indoor air line 30 is configured to circulate indoor air to the dehumidification heat exchanger, which performs the dehumidification operation. The outdoor air line 40 is configured to circulate outdoor air to the dehumidification heat exchanger, which performs the regeneration operation, so as to discharge air having a high humidity generated during regeneration to the outside.

As such, in the present disclosure, the first dehumidification heat exchanger 5 and the second dehumidification heat exchanger 6 alternately perform the dehumidification operation so as to reduce a cooling load and to provide dry air during air-conditioning, and alternately perform the regeneration operation so as to continuously maintain the dehumidification operation and thus to maintain the effects of providing the cooling load and dry air.

The above-described present disclosure may be applied in various forms. Hereinafter, the respective embodiments of the present disclosure are described.

According to the first embodiment, as shown in FIG. 1, the cooling water line 20 may include a first cooling water line 21 configured to connect the first dehumidification heat exchanger 5 to the radiator-type heat exchanger 7; a second cooling water line 22 configured to connect the second dehumidification heat exchanger 6 to the first cooling water line 21; a third cooling water line 23 and a fourth cooling water line 24 configured to branch off from the radiator-type heat exchanger 7 and to be respectively connected to the first dehumidification heat exchanger 5 and the second dehumidification heat exchanger 6; a fifth cooling water line 25 and a sixth cooling water line 26 configured to branch off from the electronic device 8 and to be respectively connected to the first dehumidification heat exchanger 5 and the second dehumidification heat exchanger 6; a seventh cooling water line 27 configured to branch off from the first cooling water line 21 and to be connected to the electronic device 8; and an eighth cooling water line 28 configured to branch off from the second cooling water line 22 and to be connected to the electronic device 8.

Here, a first valve 81 may be provided at a connection point between the first cooling water line 21 and the second cooling water line 22. A second valve 82 may be provided at a branching point between the third cooling water line 23 and the fourth cooling water line 24. A third valve 83 may be provided at a branching point between the fifth cooling water line 25 and the sixth cooling water line 26. A fourth valve 84 may be provided at a branching point between the first cooling water line 21 and the seventh cooling water line 27. A fifth valve 85 may be provided at a branching point between the second cooling water line 22 and the eighth cooling water line 28.

By such a system, when the first dehumidification heat exchanger 5 performs the dehumidification operation and the second dehumidification heat exchanger 6 performs the regeneration operation, the low-temperature cooling water flowing along the cooling water line 20 is circulated to the first dehumidification heat exchanger 5, and the high-temperature cooling water flowing along the cooling water line 20 is circulated to the second dehumidification heat exchanger 6. In other words, in the cooling water line 20, the low-temperature cooling water having passed through the radiator-type heat exchanger 7 is circulated to the first dehumidification heat exchanger 5, and the high-temperature cooling water having passed through the electronic device 8 is circulated to the second dehumidification heat exchanger 6.

Here, indoor air passes through the first dehumidification heat exchanger 5 along the indoor air line 30. Outdoor air passes through the second dehumidification heat exchanger 6 along the outdoor air line 40.

In more detail, as shown in FIG. 2, in order to perform the dehumidification operation of the first dehumidification heat exchanger 5, the first valve 81, the second valve 82 and the fourth valve 84 are adjusted so as to circulate the cooling water to the first cooling water line 21 and the third cooling water line 23. By such a system, the cooling water exchanges heat with outdoor air through the radiator-type heat exchanger 7 and thus low-temperature cooling water is formed, the low-temperature cooling water is provided to the first dehumidification heat exchanger 5, and the first dehumidification heat exchanger 5 performs the dehumidification operation through heat exchange between the low-temperature cooling water and indoor air. As such, because the indoor air moved along the indoor air line 30 is dried and the temperature of the indoor air is lowered by a designated temperature by the first dehumidification heat exchanger 5, when cooling air is formed by the evaporator 4, the cooling load is reduced, and thus energy efficiency is improved.

Further, in order to perform the regeneration operation of the second dehumidification heat exchanger 6, the third valve 83 and the fifth valve 85 are adjusted so as to circulate the cooling water to the sixth cooling water line 26, the second cooling water line 22 and the eighth cooling water line 28. By such a system, the cooling water exchanges heat with the electronic device 8 and thus high-temperature cooling water is formed, the high-temperature cooling water is provided to the second dehumidification heat exchanger 6, and the desiccant saturated in the second dehumidification heat exchanger 6 is regenerated. Here, outdoor air passes through the second dehumidification heat exchanger 6 along the outdoor air line 40, and thus, moisture generated during regeneration of the second dehumidification heat exchanger 6 is discharged together with the outdoor air to the outside.

On the other hand, when the first dehumidification heat exchanger 5 performs the regeneration operation and the second dehumidification heat exchanger 6 performs the dehumidification operation, the low-temperature cooling water flowing along the cooling water line 20 is circulated to the second dehumidification heat exchanger 6, and the high-temperature cooling water flowing along the cooling water line 20 is circulated to the first dehumidification heat exchanger 5. In other words, in the cooling water line 20, the low-temperature cooling water having passed through the radiator-type heat exchanger 7 may be circulated to the second dehumidification heat exchanger 6, and the high-temperature cooling water having passed through the electronic device 8 may be circulated to the first dehumidification heat exchanger 5.

Here, indoor air passes through the second dehumidification heat exchanger 6 along the indoor air line 30. Outdoor air passes through the first dehumidification heat exchanger 5 along the outdoor air line 40.

In more detail, as shown in FIG. 3, in order to perform the regeneration operation of the first dehumidification heat exchanger 5, the third valve 83 and the fourth valve 84 are adjusted so as to circulate the cooling water to the fifth cooling water line 25 and the seventh cooling water line 27. By such a system, the cooling water exchanges heat with the electronic device 8 and thus high-temperature cooling water is formed, the high-temperature cooling water is circulated to the first dehumidification heat exchanger 5, and the desiccant saturated in the first dehumidification heat exchanger 5 is regenerated. Here, outdoor air passes through the first dehumidification heat exchanger 5 along the outdoor air line 40, and thus, moisture generated during regeneration of the first dehumidification heat exchanger 5 is discharged together with the outdoor air to the outside.

Further, in order to perform the dehumidification operation of the second dehumidification heat exchanger 6, the first valve 81, the second valve 82 and the fifth valve 85 are adjusted so as to circulate the cooling water to the second cooling water line 22 and the fourth cooling water line 24. By such a system, the cooling water exchanges heat with outdoor air through the radiator-type heat exchanger 7 and thus low-temperature cooling water is formed, the low-temperature cooling water is provided to the second dehumidification heat exchanger 6, and the second dehumidification heat exchanger 6 performs the dehumidification operation through heat exchange between the low-temperature cooling water and indoor air. As such, because the indoor air is dried and the temperature of the indoor air is lowered by a designated temperature by the second dehumidification heat exchanger 6, a latent heat load is reduced and therefore, when cooling air is formed by the evaporator 4, a cooling load is reduced and thus energy efficiency is improved.

According to the second embodiment, as shown in FIG. 4, the radiator-type heat exchanger 7 is disposed in front of the condenser 2 on the outdoor air line 40, and thus, outdoor air may pass through the condenser 2 after passing through the radiator-type heat exchanger 7.

As such, because the radiator-type heat exchanger 7 is disposed in front of the condenser 2, the outdoor air passing through the outdoor air line 40 first exchanges heat with the radiator-type heat exchanger 7, and thus, the amount of heat exchanged by the cooling water is increased. The radiator-type heat exchanger 7 secures the sufficient heat exchange amount by the cooling water, and thus, dehumidification efficiency due to circulation of the low-temperature cooling water to the first dehumidification heat exchanger 5 or the second dehumidification heat exchanger 6 is secured. Further, because the cooling water has high specific heat and a high flow rate, even if the condenser 2 is provided behind the radiator-type heat exchanger 7, degradation of condensation performance due to the condenser 2 almost does not occur.

In this second embodiment, the positions of the radiator-type heat exchanger 7 and the condenser 2 are reversed, and the respective controls relating to the dehumidification and regeneration operations of the first dehumidification heat exchanger 5 and the second dehumidification heat exchanger 6 may be performed in the same manner as in the first embodiment.

According to the third embodiment, as shown in FIG. 5, an additional heat exchanger 50 configured to exchange heat with outdoor air may be further provided on the cooling water line 20. The outdoor air line 40 may include a first outdoor air line 41 configured to enable the outdoor air to pass through the condenser 2 and the radiator-type heat exchanger 7 and then to be discharged to the outside. The outdoor air line 40 may further include a second outdoor air line 42 configured to enable the outdoor air to flow thereinto at a position different from the position of the first outdoor air line 41, to pass through the additional heat exchanger and then to selectively pass through the first dehumidification heat exchanger 5 and the second dehumidification heat exchanger 6.

Here, the additional heat exchanger 50 is provided to cool the cooling water using the outdoor air flowing along the outdoor air line 40, and separately performs cooling of the radiator-type heat exchanger 7 and the condenser 2 and cooling of the first dehumidification heat exchanger 5 or the second dehumidification heat exchanger 6 through the first outdoor air line 41 and the second outdoor air line 42 which branch from the outdoor air line 40.

Because the first heat dehumidification heat exchanger 5 or the second dehumidification heat exchanger 6 is damaged when the heating value of the electronic device 8 is excessively greater than the amount of heat required by the first heat dehumidification heat exchanger 5 or the second dehumidification heat exchanger 6, this third embodiment is implemented to prevent damage to the first heat dehumidification heat exchanger 5 or the second dehumidification heat exchanger 6. In other words, when the heating value of the electronic device 8 is excessively greater than the amount of heat required by the first heat dehumidification heat exchanger 5 or the second dehumidification heat exchanger 6, the temperature of the cooling water must be lowered by the radiator-type heat exchanger 7. However, in this case, the temperature of the cooling water may not be sufficiently lowered by the radiator-type heat exchanger 7 due to heat exchange between the outdoor air and the condenser 2. Further, the dehumidification performance of the first heat dehumidification heat exchanger 5 or the second dehumidification heat exchanger 6 is improved as the temperature of the cooling water is lowered. However, the cooling load may be increased due to the rise in the temperature of the cooling water caused by cooling of the electronic device 8. Therefore, in order to lower the temperature of the cooling water, the additional heat exchanger 50 is employed to isolate the low-temperature cycle and the high-temperature cycle of the cooling water from each other.

According to the third embodiment, the cooling water line 20 includes, as shown in FIG. 5: a first connection line 20a configured to connect the first dehumidification heat exchanger 5 to the radiator-type heat exchanger 7; a second connection line 20b configured to connect the radiator-type heat exchanger 7 to the electronic device 8; a third connection line 20c configured to branch off from the first connection line 20a and to be connected to the additional heat exchanger 50; a fourth connection line 20d and a fifth connection line 20e configured to branch off from the additional heat exchanger 50 and to be respectively connected to the first dehumidification heat exchanger 5 and the second dehumidification heat exchanger 6; a sixth connection line 20f and a seventh connection line 20g configured to branch off from the electronic device 80 and to be respectively connected to the first dehumidification heat exchanger 5 and the second dehumidification heat exchanger 6; an eighth connection line 20h configured to branch off from the first connection line 20a and to be connected to the electronic device 8; and a ninth connection line 20i and a tenth connection line 20j configured to branch off from the second dehumidification heat exchanger 6 and to be respectively connected to the third connection line 20c and the radiator-type heat exchanger 7.

Here, a first adjustment valve 80a may be provided at a branching point between the first connection line 20a and the third connection line 20c. A second adjustment valve 80b may be provided at a connection point between the third connection line 20c and the ninth connection line 20i. A third adjustment valve 80c may be provided at a branching point between the fourth connection line 20d and the fifth connection line 20e. A fourth adjustment valve 80d may be provided at a branching point between the sixth connection line 20f and the seventh connection line 20g. A fifth adjustment valve 80e may be provided at a branching point between the first connection line 20a and the eighth connection line 20h. A sixth adjustment valve 80f may be provided at a branching point between the ninth connection line 20i and the tenth connection line 20j.

By such a system, when the first dehumidification heat exchanger 5 performs the dehumidification operation and the second dehumidification heat exchanger 6 performs the regeneration operation, the low-temperature cooling water having passed through the additional heat exchanger 50 along the cooling water line 20 is circulated to the first dehumidification heat exchanger 5, and the high-temperature cooling water having passed through the electronic device 8 along the cooling water line 20 is circulated to the second dehumidification heat exchanger 6 and the radiator-type heat exchanger 7.

Here, the indoor air passes through the first dehumidification heat exchanger 5 along the indoor air line 30. The outdoor air passes through the condenser 2 and the radiator-type heat exchanger 7 along the first outdoor line 41. The outdoor air passes through the additional heat exchanger 50 and the second dehumidification heat exchanger 6 along the second outdoor line 42.

In more detail, as shown in FIG. 6, in order to perform the dehumidification operation of the first dehumidification heat exchanger 5, the first adjustment valve 80*a*, the second adjustment valve 80*b* and the third adjustment valve 80*c* are adjusted so as to circulate the cooling water to the first connection line 20*a*, the third connection line 20*c* and the fourth connection line 20*d*. By such a system, the cooling water exchanges heat with the outdoor air along the second outdoor air line 42 through the additional heat exchanger 50. Thus, low-temperature cooling water is formed, the low-temperature cooling water is provided to the first dehumidification heat exchanger 5, and the first dehumidification heat exchanger 5 performs the dehumidification operation through heat exchange between the low-temperature cooling water and the indoor air of the indoor air line 30. As such, because the indoor air is dried and the temperature of the indoor air is lowered by a designated temperature by the first dehumidification heat exchanger 5, a latent heat load is reduced and therefore, when cooling air is formed by the evaporator 4, a cooling load is reduced and thus energy efficiency is improved.

Further, in order to perform the regeneration operation of the second dehumidification heat exchanger 6, the fourth adjustment valve 80*d*, the sixth adjustment valve 80*f*, the seventh adjustment valve 80*g* and the eighth adjustment valve 80*h* are adjusted so as to circulate the cooling water to the tenth connection line 20*j*, the second connection line 20*b* and the seventh connection line 20*g*. By such a system, the cooling water exchanges heat with the electronic device 8 and thus high-temperature cooling water is formed, and the temperature of the cooling water is lowered by the radiator-type heat exchanger 7 before the desiccant saturated in the second dehumidification heat exchanger 6 is regenerated. Therefore, even when the electronic device 8 is cooled, the temperature of the cooling water provided to the second dehumidification heat exchanger 6 is not excessively raised. This situation corresponds to the case in which the amount of heat generated by the electronic device 8 is excessively increased. In this case, the temperature of the cooling water in the radiator-type heat exchanger 7 is lowered through heat exchange with the outdoor air along the first outdoor air line 41 and the cooling water having the lowered temperature is provided to the electronic device 8. Thus, the system is capable of effectively cooling the electronic device 8 and preventing an excessive rise in the temperature of the cooling water provided to the second dehumidification heat exchanger 6.

On the other hand, when the first dehumidification heat exchanger 5 performs the regeneration operation and the second dehumidification heat exchanger 6 performs the dehumidification operation, the low-temperature cooling water having passed through the additional heat exchanger 50 along the cooling water line 20 is circulated to the second dehumidification heat exchanger 6, and the high-temperature cooling water having passed through the electronic device 8 along the cooling water line 20 is circulated to the first dehumidification heat exchanger 5 and the radiator-type heat exchanger 7.

Here, the indoor air passes through the second dehumidification heat exchanger 6 along the indoor air line 30. The outdoor air passes through the condenser 2 and the radiator-type heat exchanger 7 along the first outdoor line 41. The outdoor air passes through the additional heat exchanger 50 and the first dehumidification heat exchanger 5 along the second outdoor line 42.

In more detail, as shown in FIG. 7, in order to perform the regeneration operation of the first dehumidification heat exchanger 5, the first adjustment valve 80*a*, the fourth adjustment valve 80*d* and the fifth adjustment valve 80*e* are adjusted so as to circulate the cooling water to the first connection line 20*a*, the second connection line 20*b* and the sixth connection line 20*f*. By such a system, the cooling water exchanges heat with the electronic device 8 and thus high-temperature cooling water is formed, and the temperature of the cooling water is lowered by the radiator-type heat exchanger 7 before the desiccant saturated in the second dehumidification heat exchanger 6 is regenerated through the high-temperature cooling water. Therefore, even when the electronic device 8 is cooled, the temperature of the cooling water provided to the first dehumidification heat exchanger 5 is not excessively raised. This situation corresponds to the case in which the amount of heat generated by the electronic device 8 is excessively increased. In this case, the temperature of the cooling water in the radiator-type heat exchanger 7 is lowered through heat exchange with the outdoor air along the first outdoor air line 41 and the cooling water having the lowered temperature is provided to the electronic device 8. Thus, the system is capable of effectively cooling the electronic device 8 and preventing an excessive rise in the temperature of the cooling water provided to the first dehumidification heat exchanger 5.

Further, in order to perform the dehumidification operation of the second dehumidification heat exchanger 6, the second adjustment valve 80*b*, the third adjustment valve 80*c*, the sixth adjustment valve 80*f* and the seventh adjustment valve 80*g* are adjusted so as to circulate the cooling water to the ninth connection line 20*i*, the third connection line 20*c* and the fifth connection line 20*e*. By such a system, the cooling water exchanges heat with the outdoor air along the second outdoor air line 42 through the additional heat exchanger 50 and thus low-temperature cooling water is formed, the low-temperature cooling water is provided to the second dehumidification heat exchanger 6, and the second dehumidification heat exchanger 6 performs the dehumidification operation through heat exchange between the low-temperature cooling water and the indoor air of the indoor air line 30.

Further, when the heating value of the electronic device 8 is not sufficient, the temperature of the cooling water having passed through the electronic device 8 is low and thus does not satisfy the temperature required when the first dehumidification heat exchanger 5 or the second dehumidification heat exchanger 6 is regenerated. Therefore, measures to perform smooth regeneration of the first dehumidification heat exchanger 5 or the second dehumidification heat exchanger 6 by circulating the high-temperature cooling water having passed through the electronic device 80 to the first dehumidification heat exchanger 5 or the second dehumidification heat exchanger 6 are required.

Therefore, according to the fourth embodiment, as shown in FIG. 8, the cooling water line 20 may further include: an eleventh connection line 20*k* configured to branch off from the ninth connection line 20*i* and to be connected to the second connection line 20*b*; a seventh adjustment valve 80*g* may be provided at a branching point between the ninth connection line 20*i* and the eleventh connection line 20*k*; and an eighth adjustment valve 80*h* may be provided at a connection point between the eleventh connection line 20*k* and the second connection line 20*b*.

In more detail, when the temperature of the cooling water having passed through the electronic device 8 does not satisfy the temperature required for regeneration of the second dehumidification heat exchanger 6 in a situation in which the second dehumidification heat exchanger 6 is regenerated, the high-temperature cooling water having passed through the electronic device 8 is circulated only to the second dehumidification heat exchanger 6 along the cooling water line 20. In other words, as shown in FIG. 8, the fourth adjustment valve 80*d*, the seventh adjustment valve 80*g* and the eighth adjustment valve 80*h* are adjusted so as to circulate the cooling water to the seventh connection line 20*g*, the ninth connection line 20*i*, the eleventh connection line 20*k* and the second connection line 20*b*. By such a system, the cooling water is circulated only to the second dehumidification heat exchanger 6 and the electronic device 8. Thus, the second dehumidification heat exchanger 6 is regenerated using the heating value of the electronic device 8.

On the other hand, when the temperature of the cooling water having passed through the electronic device 8 does not satisfy the temperature required for regeneration of the first dehumidification heat exchanger 5, the high-temperature cooling water having passed through the electronic device 8 is circulated only to the first dehumidification heat exchanger 5 along the cooling water line 20. In other words, as shown in FIG. 9, the fourth adjustment valve 80*d* and the fifth adjustment valve 80*e* are adjusted so as to circulate the cooling water to the sixth connection line 20*f* and the eighth connection line 20*h*. By such a system, the cooling water is circulated only to the first dehumidification heat exchanger 5 and the electronic device 8. Thus, the first dehumidification heat exchanger 5 is regenerated using the heating value of the electronic device 8.

As such, in the third and fourth embodiments, the temperature of the cooling water circulated to the first dehumidification heat exchanger 5 or the second dehumidification heat exchanger 6 is sufficiently lowered by the additional heat exchanger 50. Thus, the cooling efficiency of the first dehumidification heat exchanger 5 or the second dehumidification heat exchanger 6 due to the circulation of the low-temperature cooling water is secured. Further, not only cooling of the electronic device 8 but also effective regeneration of the first dehumidification heat exchanger 5 or the second dehumidification heat exchanger 6 may be performed by controlling the circulation direction of the cooling water depending on the heating value of the electronic device 8.

Further, as shown in FIG. 10, the indoor air line 30 and the outdoor air line 40 may be provided with a first duct valve 60 and a second duct valve 70. The first duct valve 60 may be configured to enable the indoor air or the outdoor air to be selectively circulated to the first dehumidification heat exchanger 5 and the second dehumidification heat exchanger 6. The second duct valve 70 may be configured to enable the indoor air or the outdoor air having passed through the first dehumidification heat exchanger 5 and the second dehumidification heat exchanger 6 to be circulated to the interior of the vehicle or to the outside. The indoor air and the outdoor air may be circulated to the first duct valve 60 and the second duct valve 70.

As such, the indoor air line 30 and the outdoor air line 40 are connected through the first duct valve 60 and the second duct valve 70. Thus, the duct lines of the indoor air line 30 and the outdoor air line 40 may be simplified. Therefore, the first duct valve 60 and the second duct valve 70 may be four-way valves.

By such a system, the indoor air and the outdoor air circulated along the indoor air line 30 and the outdoor air line 40 may be selectively moved to the first dehumidification heat exchanger 5 and the second dehumidification heat exchanger 6 by adjusting the first duct valve 60. The air having passed through the dehumidification heat exchanger 5 and the second dehumidification heat exchanger 6 may be provided to the interior of the vehicle or to the outside via the evaporator 4 and the heater 9 by adjusting the second duct valve 70.

The air conditioning system for electric vehicles having the above-described structure reduces a thermal load endured by the air conditioning system using the desiccant-coated heat exchangers. The air conditioning system also maintains a reduced air-conditioning load due to the desiccant-coated heat exchangers through dehumidification and regeneration of the desiccant-coated heat exchangers. The air conditioning system also improves energy efficiency using waste heat resulting from cooling of the electronic device when the desiccant-coated heat exchanger is regenerated.

Although embodiments of the present disclosure have been disclosed for illustrative purposes, those having ordinary skill in the art should appreciate that various modifications, additions and substitutions are possible, without departing from the scope and spirit of the disclosure as disclosed in the accompanying claims.

What is claimed is:

1. An air conditioning system for electric vehicles, the air conditioning system comprising:
   a refrigerant line configured to circulate a refrigerant therealong and to be connected to a compressor, a condenser, an expander, and an evaporator;
   a cooling water line configured to circulate cooling water therealong, to be connected to a first dehumidification heat exchanger and a second dehumidification heat exchanger, to remove moisture from air, a radiator, and an electronic device, and to switch between circulation of low-temperature cooling water and circulation of high-temperature cooling water depending on whether or not the first dehumidification heat exchanger and the second dehumidification heat exchanger perform a dehumidification operation or a regeneration operation;
   an indoor air line configured to enable indoor air to selectively pass through the first dehumidification heat exchanger and the second dehumidification heat exchanger and to enable the indoor air having passed through the first dehumidification heat exchanger or the second dehumidification heat exchanger to be provided to an interior of a vehicle via the evaporator and a heater;
   an additional heat exchanger provided on the cooling water line and configured to exchange heat with the outdoor air;
   a first outdoor air line configured to enable the outdoor air to pass through the condenser and the radiator and then to be discharged outside; and
   a second outdoor air line configured to enable the outdoor air to flow thereinto at a position different from a position of the first outdoor air line, to pass through the additional heat exchanger, and then to selectively pass through the first dehumidification heat exchanger and the second dehumidification heat exchanger.

2. The air conditioning system according to claim 1, wherein, when the first dehumidification heat exchanger performs the dehumidification operation and the second dehumidification heat exchanger performs the regeneration operation, the low-temperature cooling water having passed through the additional heat exchanger is circulated to the first dehumidification heat exchanger along the cooling water line, and the high-temperature cooling water having passed through the electronic device is circulated to the second dehumidification heat exchanger and the radiator along the cooling water line.

3. The air conditioning system according to claim 2, wherein, when a temperature of the cooling water having passed through the electronic device does not satisfy a temperature required for regeneration of the second dehumidification heat exchanger, the high-temperature cooling water having passed through the electronic device is circulated only to the second dehumidification heat exchanger along the cooling water line.

4. The air conditioning system according to claim 2, wherein:
the indoor air passes through the first dehumidification heat exchanger along the indoor air line;
the outdoor air passes through the condenser and the radiator along the first outdoor air line; and
the outdoor air passes through the additional heat exchanger and the second dehumidification heat exchanger along the second outdoor air line.

5. The air conditioning system according to claim 1, wherein, when the first dehumidification heat exchanger performs the regeneration operation and the second dehumidification heat exchanger performs the dehumidification operation, the low-temperature cooling water having passed through the additional heat exchanger is circulated to the second dehumidification heat exchanger along the cooling water line, and the high-temperature cooling water having passed through the electronic device is circulated to the first dehumidification heat exchanger and the radiator along the cooling water line.

6. The air conditioning system according to claim 5, wherein, when a temperature of the cooling water having passed through the electronic device does not satisfy a temperature required for regeneration of the first dehumidification heat exchanger, the high-temperature cooling water having passed through the electronic device is circulated only to the first dehumidification heat exchanger along the cooling water line.

7. The air conditioning system according to claim 5, wherein:
the indoor air passes through the second dehumidification heat exchanger along the indoor air line;
the outdoor air passes through the condenser and the radiator along the first outdoor air line; and
the outdoor air passes through the additional heat exchanger and the first dehumidification heat exchanger along the second outdoor air line.

8. The air conditioning system according to claim 1, wherein the indoor air line, the first outdoor air line, and the second outdoor air line are provided with a first duct valve configured to enable the indoor air or the outdoor air to be selectively circulated to the first dehumidification heat exchanger and the second dehumidification heat exchanger, and with a second duct valve configured to enable the indoor air or the outdoor air having passed through the first dehumidification heat exchanger and the second dehumidification heat exchanger to be circulated to the interior of the vehicle or outside, the indoor air, and the outdoor air being circulated to the first duct valve and the second duct valve.

9. The air conditioning system according to claim 1, wherein a plurality of valves is provided on the cooling water line so as to determine a circulation path of the cooling water circulated to the first dehumidification heat exchanger, the second dehumidification heat exchanger, the radiator, and the electronic device depending on whether or not the valves are opened or closed.

10. The air conditioning system according to claim 1, wherein the cooling water line comprises:
a first cooling water line configured to connect the first dehumidification heat exchanger to the radiator;
a second cooling water line configured to connect the second dehumidification heat exchanger to the first cooling water line;
a third cooling water line and a fourth cooling water line configured to branch off from the radiator and to be respectively connected to the first dehumidification heat exchanger and the second dehumidification heat exchanger;
a fifth cooling water line and a sixth cooling water line configured to branch off from the electronic device and to be respectively connected to the first dehumidification heat exchanger and the second dehumidification heat exchanger;
a seventh cooling water line configured to branch off from the first cooling water line and to be connected to the electronic device; and
an eighth cooling water line configured to branch off from the second cooling water line and to be connected to the electronic device.

11. The air conditioning system according to claim 10, wherein
a first valve is provided at a connection point between the first cooling water line and the second cooling water line,
a second valve is provided at a branching point between the third cooling water line and the fourth cooling water line,
a third valve is provided at a branching point between the fifth cooling water line and the sixth cooling water line,
a fourth valve is provided at a branching point between the first cooling water line and the seventh cooling water line, and
a fifth valve is provided at a branching point between the second cooling water line and the eighth cooling water line.

12. The air conditioning system according to claim 1, wherein the cooling water line includes
a first connection line configured to connect the first dehumidification heat exchanger to the radiator,
a second connection line configured to connect the radiator to the electronic device,
a third connection line configured to branch off from the first connection line and to be connected to the additional heat exchanger,
a fourth connection line and a fifth connection line configured to branch off from the additional heat exchanger and to be respectively connected to the first dehumidification heat exchanger and the second dehumidification heat exchanger,
a sixth connection line and a seventh connection line configured to branch off from the electronic device and to be respectively connected to the first dehumidification heat exchanger and the second dehumidification heat exchanger, an eighth connection line configured to branch off from the first connection line and to be connected to the electronic device, and a ninth connection line and a tenth connection line configured to branch off from the second dehumidification heat exchanger and to be respectively connected to the third connection line and the radiator.

* * * * *